W. A. Dryden.
Cultivator Joint.
Nº 91,727.   Patented Jan. 22, 1869.
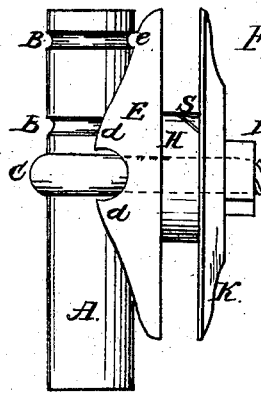
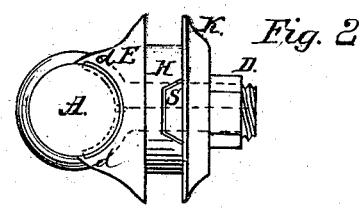
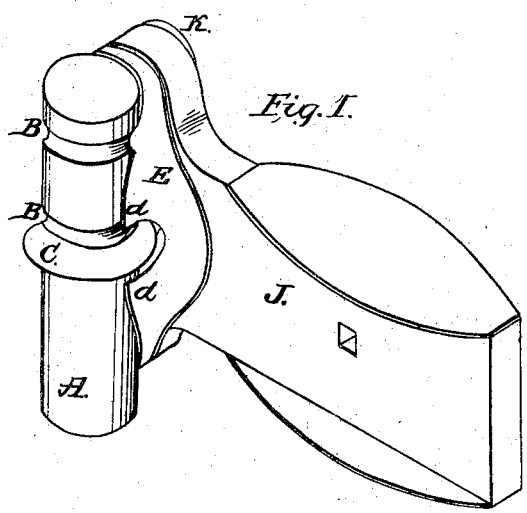
Witnesses
J. R. Richards
J. B. Hansh
Inventor:
W. A. Dryden,
per W. B. Richards, atty

United States Patent Office.

WILLIAM A. DRYDEN, OF MONMOUTH, ILLINOIS, ASSIGNOR TO HIMSELF AND J. M. TURNBULL.

Letters Patent No. 91,727, dated June 22, 1869.

IMPROVEMENT IN CULTIVATOR-JOINTS.

The Schedule referred to in these Letters Patent and making part of the same.

*To all whom it may concern:*

Be it known that I, WILLIAM A. DRYDEN, of the city of Monmouth, county of Warren, and State of Illinois, have invented certain new and useful Improvements in Cultivator-Joints; and I do hereby declare that the following is a full, clear, and exact description of the same, reference being had to the accompanying drawings, making a portion of this specification, in which—

Figure 1 is a perspective view of my invention.

Figure 2 is a top view of the same, with the beam-plate unattached.

Figure 3 is a rear elevation, with the beam-plate not shown.

Similar letters of reference indicate corresponding parts in all the figures.

The nature of this invention relates to improvements in the joint or coupling for attaching the beams of cultivators to the main frame; and The invention consists in a simple arrangement of bearing-plates and an eye-bolt, so constructed and arranged, in combination with the beam-plate and journal-spindle, as to admit of the most perfect lateral and vertical adjustment, and lateral and vertical movement or oscillation.

To enable others to understand the construction and operation of my invention, I will proceed to describe it with reference to the drawings.

A represents the journal-spindle of the main frame, to which the beams of the plows are usually attached by means of a joint.

B represents grooves around the spindle A, of which there may be any desired number.

C represents an eye-bolt, encircling the spindle A, and the two ends forming, each, a semi-cylindrical half of the shank, which is threaded, to receive the nut D.

E represents a plate, with flanges, *d*, partly encircling the spindle A, and with a tongue, *e*, fitting in the grooves B, to hold the joint at any desired position on the spindle A.

This plate E has a hole through the centre, through which passes the shank of the eye-bolt C.

H represents a cylindrical projection on the face of the plate E, and forms the bearing-surface for the beam-plate J, taking the strain of the draught off of the bolt C, by means of the flanges *d*, and allowing free vertical movement of the plows.

K represents another plate, with a projection or tongue, *s*, fitting into the groove in the cylindrical projection H, which prevents turning of the plate K, and loosening the nut D, which holds the whole arrangement in position.

The beam-plate J is cast with flanges on both sides, so that lateral adjustment of the plows may be obtained by simply changing the beam from one side to the other of the plate J.

Vertical adjustment, or varying depth of running, may be obtained by loosening the nut D, and changing the position of the tongue *e* to different ones of the grooves B, by sliding the whole device on the spindle A.

Lateral movement may be obtained by the eye-bolt sliding on and around the spindle A.

The foregoing description relates to the spindle A as used in a vertical position. It may, however, be used in a horizontal position.

What I claim as my invention, and desire to secure by Letters Patent, is—

The combination and arrangement of the plates E and K, with their respective projections H and *s*, and tongue *e*, with the eye-bolt C, nut D, grooved journal-spindle A, and beam-plate J, substantially as described, and for the purpose set forth.

Dated, at Monmouth, Illinois, this 8th day of December, 1868.

W. A. DRYDEN.

Witnesses:
JOHN A. TEMPLETON,
WM. M. BUFFINGTON.